Jan. 16, 1962 J. W. RYAN 3,017,187

MULTIPLE SPEECH PHONOGRAPH

Filed Feb. 25, 1960 2 Sheets-Sheet 1

JOHN W. RYAN,
INVENTOR.

HERZIG & JESSUP,
ATTORNEYS.

BY Albert M. Herzig

Jan. 16, 1962 J. W. RYAN 3,017,187

MULTIPLE SPEECH PHONOGRAPH

Filed Feb. 25, 1960 2 Sheets-Sheet 2

INVENTOR
JOHN W. RYAN,
HERZIG & JESSUP
ATTORNEYS.

BY Albert M Herzig 3,017,187
MULTIPLE SPEECH PHONOGRAPH
John W. Ryan, 11027 Cashmere St., Bel-Air, Calif.
Filed Feb. 25, 1960, Ser. No. 11,023
10 Claims. (Cl. 274—14)

This invention relates to a phonograph or phonograph device, by way of example in the form of a toy which is operative in response to a simple manipulation to speak or pronounce any one of a number of different sentences. The device may of course also be arranged to produce any other series or group of sounds in response to the said simple manipulation.

An illustrative example of the adaptation or utilization of the invention is that it may be embodied in a doll and then a child by a simple manipulation such as, for example, the pulling of a drawstring may cause the doll to speak or pronounce a number of different sentences. A feature of the device is that the record used has a plurality of spaced spiral grooves which are separate in a sense that each reproduces a separate and distinct sentence or other distinctive sound.

The device involves a construction and arrangement of parts making it extremely compact, rugged, durable, and effective. Means are provided whereby in response to a simple manipulation such as for example the pulling of a drawstring, the needle of the tone or reproducing arm is lifted from the record and moved to the periphery, that is to the starting point of one or another of the spiral grooves. The tone arm moves relatively to the reproducing cone or disc which is stationary and novel and improved constructional features are embodied in this part of the device.

In accordance with the foregoing, the primary object of the invention is to provide a phonograph device embodying the concept that in response to simple manipulations, it will reproduce a series of different sentences or otherwise distinctive sounds.

A further object is to provide a device as in the foregoing embodied in a figure such as a doll to simulate speech by the doll.

Another object of the invention is to provide a phonograph as in the foregoing having a record having a plurality of spaced spiral grooves or sound tracks each capable of reproducing a separate sentence or other separate distinct sound.

A further object is to provide a phonograph as in the foregoing having a tone arm cooperating with the record and movable relatively to a sound reproducing cone or disc.

Another object is to provide a construction as in the foregoing object including a driver spring interposed between the reproducing cone and the tone arm.

Another object is to provide a phonograph as set out in the foregoing having manual means so arranged that by a single simple manipulation, the tone arm may be lifted and returned to the starting point on the record, this movement being relative to the reproducing cone or disc which is stationary.

Further objects and numerous additional advantages of the invention will become apparent from the following detailed description and annexed drawings, wherein.

Figures 1, 5, 6:
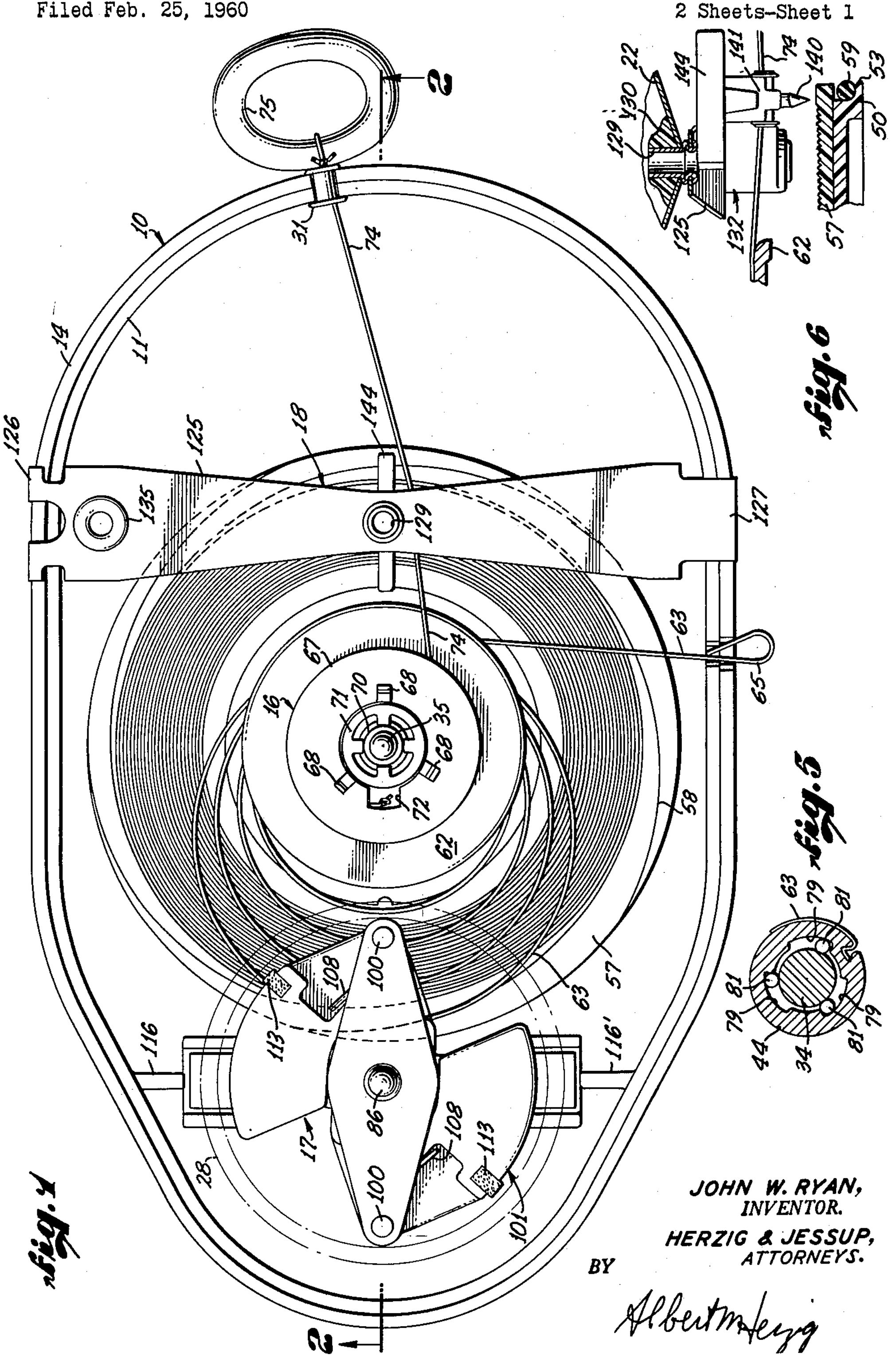
FIG. 1 is a plan view of the invention with the top or cover of the casing removed.
FIG. 5 is a sectional view taken along the line 5—5 of FIG. 2.
FIG. 6 is an enlarged, detail view of a portion of the structure shown in FIG. 3.
Figures 2, 3, 4, 7:
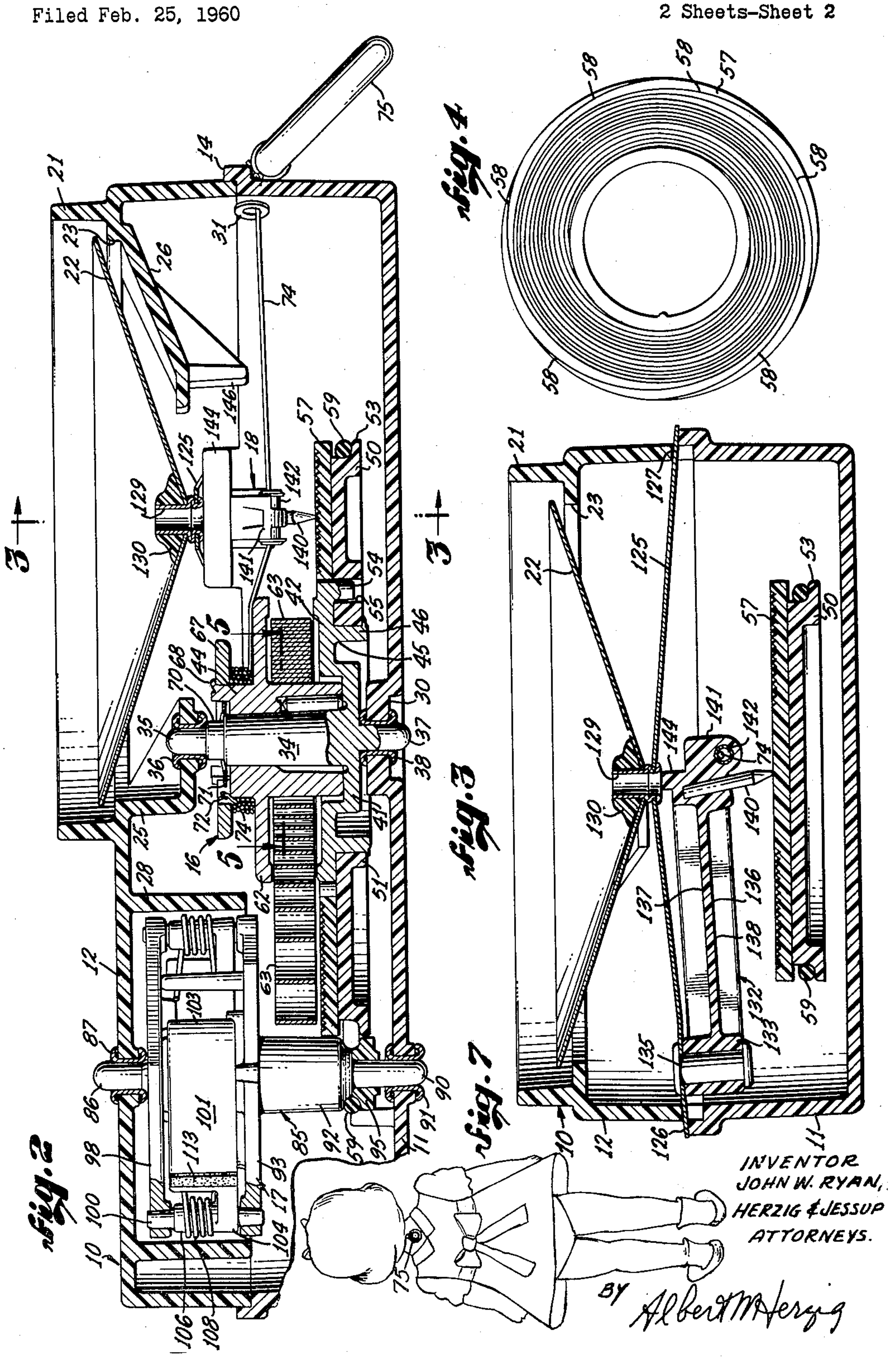
FIG. 2 is a sectional view taken along the line 2—2 of FIG. 1.
FIG. 3 is a sectional view taken along the line 3—3 of FIG. 2.
FIG. 4 is a plan view of the record disc or rotor.
FIG. 7 of the drawings illustrates a figure in the form of a doll in which the device of the invention may be incorporated.

Referring now more in detail to the drawings and more particularly FIGS. 1 and 2, the invention is shown by way of example as embodied in a plastic housing or casing 10 having a lower portion or half 11 and a cap or cover 12 as seen in FIG. 2. The housing may have the shape as shown in FIG. 1 but of course may have other shapes and configurations. Preferably, the bottom part 11 has a continuous peripheral shoulder 14 which fits against the edge of the cap or cover 12 when it is in position and the two parts may be additionally secured together by tongue and groove securements.

As may best be seen in FIG. 2, the device may be said to comprise the assemblies including the record drive assembly designated generally at 16, the governor assembly designated generally at 17 and the tone arm and reproducing assembly designated generally at 18. The housing 10 is configurated to accommodate these various assemblies.

The upper part of the housing 12 has an upwardly extending circular rim or flange 21 within which is positioned the reproducing cone 22 as will be explained presently. That is, the edges of the cone 22 are adjacent the bottom of the rim 21 and the circular opening 23.

Numeral 25 designates an inwardly extending bracket on the inside of the top or cap 12 which forms a support bearing or journal for the record spindle as will be described. Numeral 26 designates an integral bracket extending downwardly and inwardly from the inside of the top of the casing 12 which may be utilized for the purpose of mounting different types of attachments or controls for the mechanism.

Numeral 28 designates a downwardly extending circular skirt integral with the top of cap member 12 which forms a drum or housing around the governor assembly 17 as will be described presently. Numeral 30 designates a central inwardly extending boss in the bottom of the housing part 11 having a central bore which forms a bearing for the lower end of the record spindle as will be described.

Numeral 31 designates an eye or eyelet in a side of the casing part 11 to accommodate a drawstring as will be described for operating the record playing or phonograph mechanism.

The record or rotor spindle is designated at 34 having a cross-sectional configuration as best seen in FIG. 2. The upper end 35 of the spindle is journalled in a bushing 36 in the bracket 25. The lower end 37 of the spindle is journalled in a bushing 38 mounted in the boss 30.

The record spindle 34 has a circular portion 41 and a larger circular portion 42 which is offset upwardly from the part 41 as shown so as to form an annular opening or depression in which is received the lower end of the driving spring arbor 44 as will be described presently. The lower side of the record spindle 34 has an inward annular depression or groove 45 between the portion 41 and a downwardly extending circular skirt 46. Attached or secured to the spindle 34 is a circular disc which may be made of either plastic or metal as shown at 50, this disc having a central bore which fits around the skirt 46 as shown. At the bore is a short downwardly extending annular flange or shoulder 51. At the periphery of the disc 50, it has a continuous flange or shoulder as shown at 53. Numeral 54 designates a stem extending downwardly from the part 42 of the record spindle into an opening 55 in the disc 50 for holding these parts against relative rotation. The record itself is designated at 57 and it may also be attached to the disc 50 by being glued or cemented thereto. The rim or flange 53 on the disc 50 has substantially the same diameter as the record 57 so that a belt groove is formed between the record 57 and the rim or flange 53. This groove receives a driving belt 59 which, by way of example, is a means for driving the governor as will be described presently.

The record 57 in itself is unique and it is unique in its cooperation with the other parts of the phonograph. It has a plurality of individual interleaving spiral grooves as may be seen in FIGURE 4, each of which is a separate sound track on which is recorded a distinctive sound, for example a distinctive complete sentence.

As will be explained more in detail hereinafter, the device possesses the quality of randomness of operation in that upon each operation the needle may engage any one of the various grooves randomly so that the sound that is reproduced cannot be anticipated. This is an intentional objective of the invention. The randomness of the operation is further assured by other variable factors including the engagement, and disengagement, of the needle; the inertial run-on of the turntable and record in connection with the clutch and drive mechanism and the friction of the pivot.

Another feature of the record 57 is the "fast pitch" lead-in section of each groove as designated at 58. These lead-in sections as can be seen have greater spacing than there is between the grooves in the body of the record. Thus, by this special and deliberate means used with the multi-groove design the needle is able to select separate tracks dependably. An advantage of the "fast pitch" groove area or "selection band" at the edge of the record is that slight irregularities or damage to each groove do not cause the needle to fall into one groove at the expense of another. That is, otherwise a small scratch or irregularity might cause one groove to be played whenever the needle falls into it initially or into an adjacent groove, resulting in inoperativeness of the said adjacent groove.

Another advantage and conspicuous feature of the multi-track inter-leaved groove record in its cooperation with the remaining parts of the device is that no matter where the record is engaged by the needle, the needle engages a part of the track immediately adjacent to the beginning of the sound on that particular track; that is, it is unnecessary for the record to progress through a full turn of blank groove to insure that the needle is engaging in a groove at a point preceding the beginning of the sound material in the groove. The device operates to produce sound promptly after the engagement of the groove by the needle so that there is no waste turning of the record and no waste of power and wind-up capacity and the device responds audibly almost immediately. The arrangement insures that the needle will engage the beginning of one sound groove or another with the minimum possible lapse of time after the tone arm has been moved to engage the record.

The spring arbor 44 has the configuration as shown in FIG. 2 having a central bore, the upper part of which fits over the slightly tapered spindle 34. It has an extending circular part 62 spaced from the upper end of the arbor forming a pulley as will be described. The driving spring is a clock spring as designated at 63, the inner end of which is secured to the spring arbor 44 as may be seen in FIG. 5. The other end of the spring 63 extends outwardly through an opening in the side of the casing 10 and is looped as shown at 65 in FIG. 1 to hold it.

Attached to the upper end of the arbor 44 is a plate or disc 67 which is attached by way of ears as shown at 68 extending from the arbor through openings in the disc 67. The upper end of the spindle 34 has a portion 70 of smaller diameter and engaged on this portion is a retaining ring 71 which bears against the shoulder of spindle 34 adjacent its portion 70. The periphery of the retaining ring 71 engages with the arbor 44. The disc 67 has radial slot 72 at its bore and received in this slot is a knot at the end of drawstring 74 which wraps around the pulley, that is, the upper part of arbor 44 between disc 67 and the extending circular part 62. The drawstring extends through the tone arm assembly 18 as will be described presently, through the eyelet 31 to the exterior of the housing and is attached to a ring 75 for convenient grasping and operating by a child, for example.

Pulling on the drawstring rotates the pulley, that is the arbor 44, and winds up the clock spring 63 and the spring is then able to drive the record disc. A one-way clutch or drive is provided between the record spindle 34 and the spring arbor 44. This construction is illustrated in cross-section in FIG. 5. On the inside of the lower skirt portion of spring arbor 44, it has the angularly spaced axially extending grooves 79 the surfaces of which curve outward slightly from the central axis of spindle 34. Disposed in these spaces between the skirt of arbor 44 and the spindle 34, are the rollers or bearing members 81. As may be seen in FIG. 5, if the arbor 44 is rotated in a clockwise direction, the rollers 81 move to the wider part of the slots, that is, the spaces between the arbor and the spindle 34 and thus do not frictionally engage between these members and the arbor 44 is not driven. On the other hand, if arbor 44 moves in a counter-clockwise direction, the rollers 81 move to the narrower part of the openings or spaces so as to frictionally engage between the arbor 44 and the spindle 34 and to thus drive the spindle. The effect is that when the spring 63 is wound by pulling on the drawstring 74, the record disc is not rotated. The record disc 57 is however rotated in the opposite direction while being driven by the spring 63.

It has a plurality of separate spaced grooves or tracks on each of which by way of example is recorded a separate sentence such as might be spoken or pronounced by a child and figuratively, by a doll. As will be explained presently when the tone arm with the needle is moved to the periphery of the disc, it may engage one or another of the spiral grooves and depending upon which one it engages, a different sentence or a different distinctive sound will be reproduced.

Means are provided in the form of a rotary governor to regulate the speed at which the record disc is driven, this assembly being designated generally as previously pointed out at 17. It comprises a rotor member which may be a casting for example, as designated at 85 having an upper end or spindle 86 journalled in a bushing 87 in the top of the housing 12. It has a lower end or spindle 90 journalled in a bushing 91 in the bottom of the housing part 11. The rotor member 85 has an enlarged portion 92 and at the upper end of this portion is an extending web 93. Adjacent the lower part of the enlarged portion 92 is a drive pulley 95 providing a groove between itself and the lower part of portion 92. The driving belt 59 is engaged in this groove as shown. It should be understood of course that other types of drives such as a gear drive may be utilized for driving the governor. Numeral 98 designates an upper web member similar in shape to the web member 93. Web member 98 has a central bore which fits over the upper end portion of the rotor member 85. Fitting between the ends of the web members 93 and 98 are posts or pins as shown for example at 100, the ends of which are tapered fitting into bores or openings in the webs. There are two radially movable governor members or weights movable outwardly under the influence of centrifugal force pivotally mounted on these posts. These members are identical and therefore only one will be described in detail. One of them is designated at 101. It comprises an arcuate weight portion 103 having a mounting arm 104 connected integrally to bushing 106 journalled as shown on the post or pin 100. Numeral 108 designates a torsion spring wrapped around the bushing 106. One end of this spring engages a post extending upwardly from the web member 93 and this post for the other weight member is shown at 110 in FIG. 2. The other end of the torsion spring engages with a portion of the weight member 101 so that it is normally urged inwardly, that is radially, and this movement is limited by a stop member on the web 93 of the rotor 85.

The weight member 101 has a radial slot in which is disposed a strip of fabric as shown at 113 or other suitable material which serves as braking material. The governor operates in a manner which will be readily understood by those skilled in the art. It is driven at a suitable or appropriate speed by way of the belt 59 as described. As the speed increases, the weights or centrifugal members move outwardly under the influence of centrifugal force and against the force of the torsion springs. The fabric members 113 may engage the interior surface of the skirt or drum 28 so that this frictional engagement retards or restrains rotation of the governor and thus limits the speed of rotation. In this manner, the speed of rotation of the disc or record 57 is controlled and regulated and maintained at the optimum speed for desirable reproduction of sounds.

Numerals 116 and 116′ in FIG. 1 designate stabilizing webs which may be provided on the interior of the casing 10 extending inwardly for the purpose of providing additional means for engaging and stabilizing the rotor 85. These members are however optional and may be omitted.

The tone arm and reproducing assembly which has been designated at 18 is shown in cross-section in FIG. 3 and certain of the parts are shown enlarged in FIG. 6. Numeral 125 designates a flat driving spring for the reproducing cone 22 having the shape as may best be seen in FIG. 1. It is mounted in the casing or housing 10 in a position below the reproducing cone 22. At its ends it has tongues as shown at 126 and 127 engageable in slots or openings in the casing 10 for securement. The tongues 126 are in the form of laterally extending hooks as shown which may hook into openings in the casing 10 with the tongue 127 extending into an opening or groove in the opposite side of the casing.

At the center of the spring 125, it has an opening and at this point is secured the lower end of a small tubular member 129, the securement preferably being by way of the flanges as shown adjacent the opening in the spring as may be seen in FIG. 2. The tubular member 129 extends through an opening in and mounts the reproducing cone 22 which may be additionally secured to the member 129 such as by way of glue or wax as indicated at 130.

The tone arm is shown more in detail at 132 in FIG. 3. At its left end it has an integrally formed bushing 133 having a bore journalled on a pin or eyelet 135 having flanged ends which is mounted from the spring 125 as shown. The arm 132 has a central web 136 adjacent which are longitudinally extending grooves 137 and 138 so that the tone arm is very light. It may be fabricated from plastic for example. The needle 140 is mounted slightly angularly as shown at the end of the tone arm and beyond the needle. The tone arm has a portion 141 in which is positioned transversely an eyelet 142 having flanged ends as shown and through which passes the drawstring 74. Near the end of the tone arm at its upper part is a transversely extending rib 144 which slidably engages the flange or rim at the lower end of the tubular member 129 which as described is attached to the driving spring 125 for the reproducing cone. The tone arm is movable about its pivotal mountings so that the needle 140 can be swung from an intermediate point on the record, that is from the end of the playing surface to the periphery. When the tone arm so moves, the rib 144 slides frictionally relative to the lower end of the tubular member 129. That is, the reproducing cone 22 does not move with the tone arm itself; these parts move relatively.

As may be seen in FIG. 3, the eyelet 142 in the end of the tone arm is slightly below the circular part 62 of the pulley around which the drawstring 74 is wrapped. Normally, in operation when the needle has moved to the interior of the playing surface of the record 57, the drawstring 74 is then manipulated, that is, it is pulled or tensioned by the drawstring 74 by grasping and pulling the ring 75. The tension in the string or cord 74 is sufficient to lift the tone arm 132 from the surface of the record against the force of the spring 125 which may bend or bow slightly to accommodate this purpose. As the cord or string 74 is pulled, the friction between it and the interior of the eyelet 142 is sufficient to move the tone arm to the exterior or periphery of the record 57. At this point, its movement is terminated or stopped by a stop member 146 extending from the bracket 26.

The tone arm has now been properly positioned for another operation and the needle 140 may now engage in any one of the spiral grooves of the record as previously described. That is, there may result from each manual operation that the device speaks or pronounces a different sentence or other distinctive sound. A fascinating feature of the invention is that when it is embodied in a doll, for example, the child does not know what response he or she is going to get from the doll, speaking figuratively that the words that are spoken or pronounced by the phonograph device are a response to what the child has said to the doll.

Continuing the description of the operation, the engagement of the tone arm with the stop 146 does not restrain continued movement of the drawstring or cord 74. Pulling on the drawstring of course winds the spring 63 as previously described by rotating its pulley and this operation as stated is not terminated or prevented by reason of the tone arm having been returned to its starting position. The spring 63 may be completely wound by one extended pull on the drawstring. However, less extended or shorter pulls may be exerted on the drawstring simply for the purpose of resetting the tone arm to the initial position to reproduce the different sentences or distinctive sounds from the record 57. Each of such shorter pulls partially winds the spring 63, the winding being accomplished through the one-way clutch or drive as previously described. As may be observed, therefore, the particular nature of the mechanism provides a construtcion which is simple and effective but yet very rugged and durable and capable of withstanding rather rough treatment. Particularly, it will withstand and properly respond to any manipulations that may be made by a child who does not of course understand the details of the mechanism but perceives only that by pulling the drawstring, the device will be caused to reproduce sounds. The nature of the mechanism is such that it does not impose a requirement on the operator that the length of pull of the drawstring or the force exerted must be nicely judged or gauged. The device therefore accommodates itself very well to the treatment expected to be given it by children.

While the record is being played, the governor is of course being driven in the manner previously described and as explained the governor regulates and controls the speed of rotation of the record to provide for optimum reproduction conditions.

From the foregoing, those skilled in the art will observe that the invention embraces the fascinating concept of providing a device which will figuratively speak for itself and is adapted to speak or say things which the operator is not able to anticipate, at least not exactly. The invention embraces the concept of a device which a child for example may speak to and then receive a response from, which response is, in effect, chosen and selected by the device itself since the operator does not know which of the sound tracks or spiral grooves on the record will be engaged by the needle.

Those skilled in the art will also observe that the physical embodiment of the invention as disclosed herein provides novel and original features and structural arrangements providing for a very high degree of effectiveness and utility. The movements are extremely simplified and extraordinarily adapted to treatment to be expected from a child. The tone arm moves relatively to the reproducing cone not requiring that the latter be one of the moving parts. The actual movements are limited to movements absolutely necessary to the required operations and are reduced to a very simple form.

It is to be understood that the invention is not to be limited to the precise forms and embodiments as disclosed herein since they are intended to be illustrative of the principles of the invention. The concept and principles of the invention may be embodied in other devices of larger size and adapted in other forms. The invention is to be accorded the full scope of the claims appended hereto.

What is claimed is:

1. In a phonograph device for use in a figure toy, a movably mounted record member having recorded thereon a plurality of discrete sound sequences all starting at substantially the same starting position, driving means for moving said record an amount to reproduce only one of said sound sequences, sound reproducing means engageable with said record for reproducing the sound recorded thereon, manually controlled means for energizing said driving means, and means responsive to sequential operations of said manually controlled means for positioning said reproducing means at the starting position of said discrete sound sequences whereby all of said sound sequences may be reproduced upon repeated operations of said manually moveable and driving means.

2. A device as defined in claim 1 wherein said record member comprises a disc record, each of said discrete sound sequences being recorded in a separate signal groove, said spiral grooves being interleaved on said record whereby said starting position is adjacent the outer periphery thereof.

3. A device as defined in claim 2 wherein said means for positioning said reproducing means controls only the radial position thereof whereby selection of the particular spiral groove is purely random.

4. A phonograph device adapted for use in a figure such as a doll, said device having record means having recorded thereon various sounds corresponding to sound which might emanate from the said figure, and manual means for resetting the said device to a starting point, the record means having a plurality of interleaved sound tracks, each of which will reproduce separately whereby different sounds or groups of sounds are reproduced by the device by chance depending upon the particular starting point engaged, drive means energizable by actuation of said manual means, said manual means comprising a drawstring, and means whereby the tone arm is lifted and reset by the drawstring.

5. In a phonograph device for use in a figure toy, a moveably mounted member having recorded thereon a plurality of discrete sound sequences each having a starting position, driving means for moving said member to reproduce any one of said sound sequences, means for stopping said member after reproducing only one of said sound sequences, sound reproducing means engageable with said member for reproducing the sound recorded thereon, manually controlled means for energizing said driving means, and means responsive to sequential operations of said manually controlled means for restarting said drive means and initiating operation of said reproducing means at the starting position of a different sound sequence whereby all of said sound sequences may be separately reproduced upon repeated operations of said manually moveable and driving means.

6. A phonograph device as defined in claim 5 including means operable by said manually controlled means for moving said reproducing means to the starting position of a different sound sequence, upon initial actuation thereof to energize said driving means.

7. A figure toy comprising, in combination; a toy figure; sounding means housed within said figure; said sounding means comprising means having recorded thereon a plurality of discrete sound sequences each being of a sound characteristic of the personality represented by said figure, means for reproducing said recorded sounds, said sounding means including driving means for said means having sounds recorded thereon for reproducing one of said recorded sound sequences and stopping after reproducing one sound sequence; and manual control means, for initiating operation of said driving means, having a portion accessible from the exterior of said figure and sequentially operable to effect sequential reproduction of different ones of said recorded sound sequences.

8. A figure toy comprising, in combination; a toy figure; sounding means housed within said figure; said sounding means comprising means having recorded thereon a plurality of discrete sound sequences each being of a sound characteristic of the personality represented by said figure, means for reproducing said recorded sounds, and manually controlled means for driving said means having said sounds recorded thereon for reproducing said recorded sound sequences and including means for initiating operation of said driving means and for stopping said driving means at the end of one of said plurality of discrete sound sequences.

9. In a phonograph device for use in a figure toy, a rotary disc record member having sounds recorded thereon, driving means for rotating said record, moveable sound reproducing means engageable with said record for reproducing the sound recorded thereon, manually controlled means for energizing said driving means, and means responsive to operation of said manually controlled means for lifting and moving said reproducing means to the starting point of said record, said sound reproducing means comprising a tone arm mounted for movement across a portion of said record, said manually controlled means comprising a drawstring extending across said portion of said record and manually operable to initiate operation of said driving means by predetermined longitudinal movement thereof, said drawstring engaging said tone arm whereby initial movement of said drawstring moves said tone arm to the starting point of said record before starting record-driving operation of said driving means.

10. A device as defined in claim 9 wherein said driving means comprises a spring motor, said movement of said drawstring being operable to wind said spring whereby release of said drawstring permits said motor to rotate said record, said tone arm being also moveable toward and from the surface of said record and being resiliently biased toward said record whereby tension on said drawstring lifts said tone arm and release of said drawstring lowers said tone arm onto said record.

References Cited in the file of this patent

UNITED STATES PATENTS

| | | |
|---|---|---|
| 1,167,838 | Prout | Jan. 11, 1916 |
| 1,979,067 | Franklin | Oct. 30, 1934 |
| 2,307,259 | Fling | Jan. 5, 1943 |
| 2,552,757 | Adler | May 15, 1951 |
| 2,886,328 | Duncan | May 12, 1959 |
| 2,961,242 | Zimmerman | Nov. 22, 1960 |
| 2,972,483 | Rodgers | Feb. 21, 1961 |